US011550306B2

(12) United States Patent
Nagata et al.

(10) Patent No.: US 11,550,306 B2
(45) Date of Patent: Jan. 10, 2023

(54) INFORMATION COLLECTION SYSTEM FOR INDUSTRIAL EQUIPMENT, CONTROL APPARATUS FOR INDUSTRIAL EQUIPMENT, AND INFORMATION COLLECTION METHOD FOR INDUSTRIAL EQUIPMENT

(71) Applicant: Kabushiki Kaisha Yaskawa Denki, Kitakyushu (JP)

(72) Inventors: Takeshi Nagata, Kitakyushu (JP); Takahiko Suzuki, Kitakyushu (JP); Kengo Goto, Kitakyushu (JP); Yosuke Kamiya, Kitakyushu (JP); Shinichiro Obata, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 17/097,163

(22) Filed: Nov. 13, 2020

(65) Prior Publication Data
US 2021/0157301 A1 May 27, 2021

(30) Foreign Application Priority Data
Nov. 25, 2019 (JP) .............................. JP2019-212352

(51) Int. Cl.
*G05B 19/418* (2006.01)

(52) U.S. Cl.
CPC .................... *G05B 19/4183* (2013.01); *G05B 2219/31304* (2013.01)

(58) Field of Classification Search
CPC ...... G05B 19/4183; G05B 2219/31304; G05B 19/418; G05B 9/0423; Y02P 90/02
See application file for complete search history.

(56) References Cited

U.S. PATENT DOCUMENTS

2017/0153616 A1 6/2017 Sakakibara et al.
2018/0335768 A1* 11/2018 Sano .................. G05B 19/4183
2019/0196442 A1* 6/2019 Ezawa ................ G05B 19/406

FOREIGN PATENT DOCUMENTS

JP          2008-299721 A      12/2008
JP            6096872 B1        3/2017

OTHER PUBLICATIONS

Office Action dated Mar. 5, 2020 in corresponding Japanese Patent Application No. 2019-212352 (with English-language Translation), citing documents AO therein, 9 pages.

(Continued)

*Primary Examiner* — Michael W Choi
(74) *Attorney, Agent, or Firm* — Oblon, McClelland, Maier & Neustadt, L.L.P.

(57) ABSTRACT

An information system for industrial equipment includes processing circuitry that controls processing apparatuses that each execute a predetermined process with respect to at least one workpiece, respectively collects, from the processing apparatuses, processing information sets that are respectively related to processing steps executed by the processing apparatuses until one corresponding product is manufactured from the at least one workpiece, and associates the processing information sets by assigning to the processing information sets a link identifier that permits a linkage between respective steps of the processing steps related to the one corresponding product.

19 Claims, 10 Drawing Sheets

(56) References Cited

OTHER PUBLICATIONS

Extended European Search Report dated Apr. 21, 2021 in corresponding European Patent Application No. 202054821, citing documents AW-AY therein, 15 pages
Unknown: "Doubly Linked List", Jul. 11, 2017, XP055794720, pp. 1-10, Retrieved from the Internet: URL:https://web.archive.org/web/2017071120 5246/https://www.geeksforgeeks.org/doubly-linked-list/.
Rao R: "Lecture 5: Lists, Stacks and Queues", CSE, Apr. 4, 2001, XP055794725, 5 pages Retrieved from the Internet: URL:https://courses.cs.washington.edu/courses/cse373/01sp/Lect5.pdf.
B. M. Li et al., "Step-Based Data Sharing and Exchange in One-of-a-Kind Product Collaborative Design for Cloud Manufacturing", Advances in Mechanical Engineering, vol. 5, Jan. 1, 2013, XP055794726, pp. 1-16 ISSN: 1687-8140, DOI: 10.1155/2013/135291 Retrieved from the Internet: URL:http://downloads.hindawi.com/journals/ame/2013/135291.pdf.

* cited by examiner

FIG. 9

Process ID management table

| Product ID | Step (A) process ID | Step (B) process ID | Step (C) process ID |
|---|---|---|---|
| 1 | 1 | 2 | 3 |
| 2 | 4 | 5 | 6 |
| ... | ... | ... | ... |
| N | M | M+1 | M+2 |

Material, Part → Step (A) → Step (B) → Step (C) → Product (finished product)

- When all process ID frames (columns) provided corresponding to one product (row) are recorded, a product ID is generated and recorded, and is output to the upper management device together with processing information.

INFORMATION COLLECTION SYSTEM FOR INDUSTRIAL EQUIPMENT, CONTROL APPARATUS FOR INDUSTRIAL EQUIPMENT, AND INFORMATION COLLECTION METHOD FOR INDUSTRIAL EQUIPMENT

CROSS-REFERENCE TO RELATED APPLICATIONS

The present application is based upon and claims the benefit of priority to Japanese Patent Application No. 2019-212352, filed Nov. 25, 2019. The entire contents of this application are incorporated herein by reference.

BACKGROUND OF THE INVENTION

Field of the Invention

The invention relates to an information collection system for industrial equipment, a control apparatus for industrial equipment, and an information collection method for industrial equipment.

Description of Background Art

Japanese Patent No. 6096872 describes a structure in which a production management apparatus notifies each manufacturing machine arranged on a manufacturing line of a unique ID, and the each manufacturing machine attaches production performance information to the unique ID and transmits the resulting combination back to the production management apparatus. The entire contents of this publication are incorporated herein by reference.

SUMMARY OF THE INVENTION

According to one aspect of the invention, an information system for industrial equipment includes processing circuitry that controls processing apparatuses that each execute a predetermined process with respect to at least one workpiece, respectively collects, from the processing apparatuses, processing information sets that are respectively related to processing steps executed by the processing apparatuses until one corresponding product is manufactured from the at least one workpiece, and associates the processing information sets by assigning to the processing information sets a link identifier that permits a linkage between respective steps of the processing steps related to the one corresponding product.

According to another aspect of the preset invention, a control apparatus for industrial equipment includes processing circuitry that respectively collects, from processing apparatuses that each execute a predetermined process with respect to at least one workpiece, processing information sets that are respectively related to processing steps executed by the processing apparatuses until one corresponding product is manufactured from the at least one workpiece, and associates the processing information sets by assigning to the processing information sets a link identifier that permits a linkage between respective steps of the processing steps related to the one corresponding product.

According to yet another aspect of the preset invention, an information collection method for industrial equipment is to be executed in an information collection system for industrial equipment, and the information collection system has processing circuitry that controls processing apparatuses that each execute a predetermined process with respect to at least one workpiece. The information collection method includes respectively collecting, from the processing apparatuses, processing information sets that are respectively related to processing steps executed by the processing apparatuses until one corresponding product is manufactured from the at least one workpiece, and associating the processing information sets by assigning to the processing information sets a link identifier that permits linkage between the processing steps related to the one corresponding product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is an explanatory diagram illustrating an example of processing in a case where process IDs are managed using a table.

DETAILED DESCRIPTION OF THE EMBODIMENTS

Figure 1:
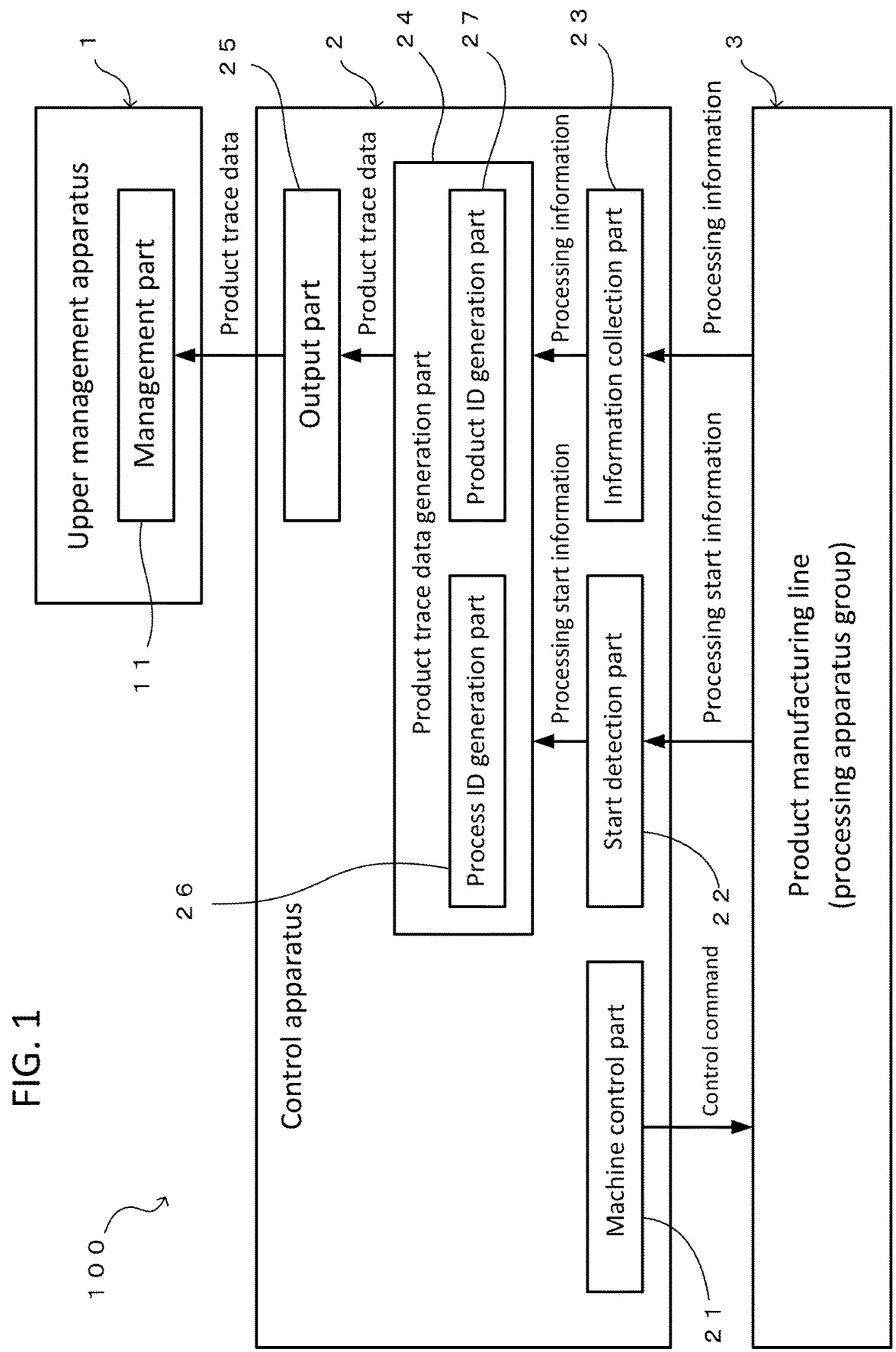
FIG. 1 illustrates an example of an overall structure of an information collection system according to an embodiment of the present invention.

Embodiments will now be described with reference to the accompanying drawings, wherein like reference numerals designate corresponding or identical elements throughout the various drawings.

1. Overall Structure of Information Collection System

First, an example of a structure of an information collection system according to the present embodiment is described with reference to FIG. 1. FIG. 1 illustrates an example of an overall structure of the information collection system according to the present embodiment. In the example of the present embodiment illustrated in FIG. 1, an information collection system is described that collects various types of processing information related to a product manufacturing line that manufactures a product by performing multiple processing steps with respect to a workpiece supplied thereto.

An information collection system 100 (corresponding to an information collection system for industrial equipment) includes an upper management apparatus 1, a control apparatus 2 and a product manufacturing line 3.

The upper management apparatus 1 is formed by a computer or the like having a CPU, memories such as an ROM and an RAM, a mass storage device such as a HDD, an operation part, a display part, and the like, and functions, via a management part 11 implemented by software on the upper management apparatus 1, to store, analyze, display or manage product trace data output from the control apparatus 2 (to be described later).

The control apparatus 2 (corresponding to a control apparatus for industrial equipment) is formed of a computer, a PLC (programmable logic controller), an MC (motion controller) or the like having a CPU, memories such as an ROM and an RAM, and the like (see FIG. 10), and includes a machine control part 21, a start detection part 22, an information collection part 23, a product trace data generation part 24, and an output part 25, which are implemented, for example, by software.

The machine control part 21 (corresponding to a control part) functions to generate control commands for driving and controlling multiple processing apparatuses provided in a product manufacturing line (to be described later) and output the control commands at appropriate timings.

The start detection part 22 functions to detect processing start information that is output when each of the multiple processing apparatuses starts to execute processing with respect to a workpiece.

A detection signal in a case where the multiple processing apparatuses each detect the arrival of a workpiece with a sensor or the like and are each in a preparatory state before the start of processing may be used as processing start information.

The information collection part 23 (corresponding to a collection part) functions to collect various processing information related to the processing executed by the multiple processing apparatuses with respect to the workpieces. Details of the processing information will be described later.

The product trace data generation part 24 (corresponding to an association part) functions to generate product trace data in which the multiple processing information sets collected by the information collection part 23 are associated with each other by assigning to the multiple processing information sets a link identifier that enables a linkage between the multiple processing steps related to one product. The product trace data generation part 24 in the example of the present embodiment has a process ID generation part 26 (corresponding to a first process ID generation part) that generates a process ID (corresponding to a process ID) as the link identifier in response to the detection of the start detection part 22, and a product ID generation part 27 (corresponding to a product ID generation part) that generates a product ID as the link identifier to be assigned to a completed product that has been subjected to all the processing steps. Methods for generating various link identifiers in the product trace data generation part 24 and data structures of product trace data are described in detail later.

The output part 25 functions to output the product trace data generated by the product trace data generation part 24 to the upper management apparatus 1.

The division of the processes performed in the upper management apparatus 1, the control apparatus 2 and the like described above is not limited to the above example. For example, these processes may be performed by a smaller number of control apparatuses (for example, one control apparatus), or may be divided and performed by a larger number of further differentiated apparatuses. Further, the process of the control apparatus 2 may be implemented by a program executed by a CPU 901 (arithmetic device; see FIG. 10) (to be described later), or a part of the process or the entire process may be implemented by an actual device such as an application specific integrated circuit such as an ASIC or FPGA, or by other electrical circuits.

2. Product Manufacturing Line

Figure 2:
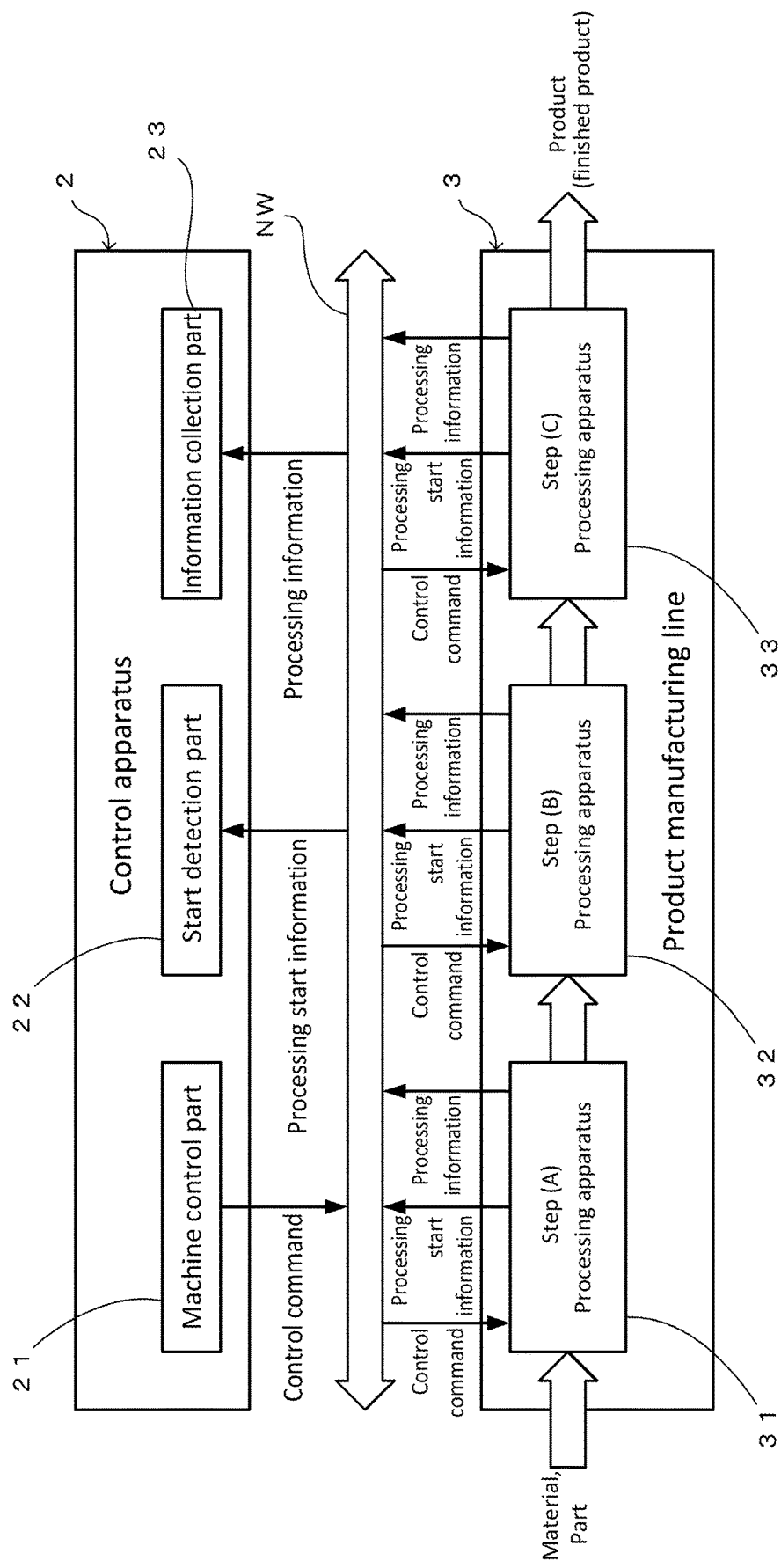
FIG. 2 illustrates an example of various commands and various types of information transmitted or received between processing steps inside a product manufacturing line and a control apparatus.

The product manufacturing line 3 in the example of the present embodiment refers to a mechanical system in which, for example, as illustrated in FIG. 2, a predetermined material or part is supplied as a workpiece and multiple processes are executed in a predetermined processing order with respect to the workpiece, and thereby, a product as a final finished product is manufactured. The multiple processes are each performed by a dedicated processing apparatus, and the workpiece is automatically conveyed by an appropriate conveying means such as a belt conveyor (not particularly illustrated in the drawing) between the multiple processing apparatuses arranged in the processing order of the processing steps.

Specific contents of the processing steps include various contents such as mechanical, electromagnetic or chemical processing, assembly, inspection, and measurement. Further, for connection structures of the processing apparatuses in the product manufacturing line 3, various patterns are conceivable according to a specification or a structure of a product to be manufactured. Therefore, the machine control part 21 of the control apparatus 2 outputs control commands at appropriate timings so that the processing apparatuses and the conveyance means appropriately cooperate with each other in accordance with an internal structure of the product manufacturing line 3 as a control target, and can grasp all at which ordinal positions or in which processing steps a large number of supplied individual workpieces are at the time.

In the following, for ease of understanding an information management function of the information collection system 100 according to the present embodiment, the internal structure of the product manufacturing line 3 is described using as an example a structure in which, as illustrated in FIG. 2, processing apparatuses (31, 32, 33) that respectively correspond to three processing steps (A, B, C) are arranged in series in a processing order of the processing steps and perform a workflow with respect to a workpiece.

Then, every time each of the processing apparatuses (31, 32, 33) executes one processing operation with respect to a workpiece, the each of the processing apparatuses (31, 32, 33) acquires various types of processing information related to the processing operation, and transmits the processing information to the control apparatus 2. Examples of specific contents of the processing information include various types of information such as: actual driving information such as time series change data of a position, a speed, a torque or the like of a motor as a drive source in a case where the processing operation is a mechanical operation; an inspection result or actual measurement information in a case where the processing operation is inspection or measurement; a time stamp (time information) indicating an execution time of the processing operation; environmental information such as an ambient temperature or humidity at the time of the processing operation; and various types of alarm information (not particularly illustrated in the drawings). As the timing at which each the processing apparatuses (31, 32, 33) transmits the processing information to the control apparatus 2, in addition to transmitting the processing information each time a processing operation is executed as described above, for example, it is also possible to transmit the processing information collected until a processing operation has been executed a predetermined number of times (for a predetermined number of workpieces), or to transmit all the processing information collected until all processing operations on that operating day have been completed. In these cases, it is sufficient as long as association between a processing information set and a corresponding processing operation executed with respect to an individual workpiece can be finally grasped on the control apparatus 2 side.

Further, in the example of the present embodiment, when each of the processing apparatuses (31, 32, 33) executes a processing operation with respect to a workpiece, processing start information notifying the start of the processing operation is autonomously transmitted to the control apparatus 2. As a result, the control apparatus 2 can grasp at what timing each of the processing apparatuses (31, 32, 33) has performed a processing operation with respect to a workpiece in the entire product manufacturing line 3.

In FIG. 2, for convenience of illustration, it is illustrated that the control apparatus 2 collectively transmits or receives various commands or various types of information via a network (NW) to or from the multiple processing apparatuses (31, 32, 33) in the product manufacturing line 3. However, it is assumed that which one of the processing apparatuses (31, 32, 33) is a transmission source of received information or a recipient of a command to be transmitted can be grasped on the control apparatus 2 side. Although not particularly illustrated in the drawings, it is also possible to provide a connection structure in which the machine control part 21, the start detection part 22, and the information collection part 23 are connected to the processing apparatuses (31, 32, 33) by dedicated lines without using the common network (NW).

3. Product Trace Data and Various IDs

Figure 3:
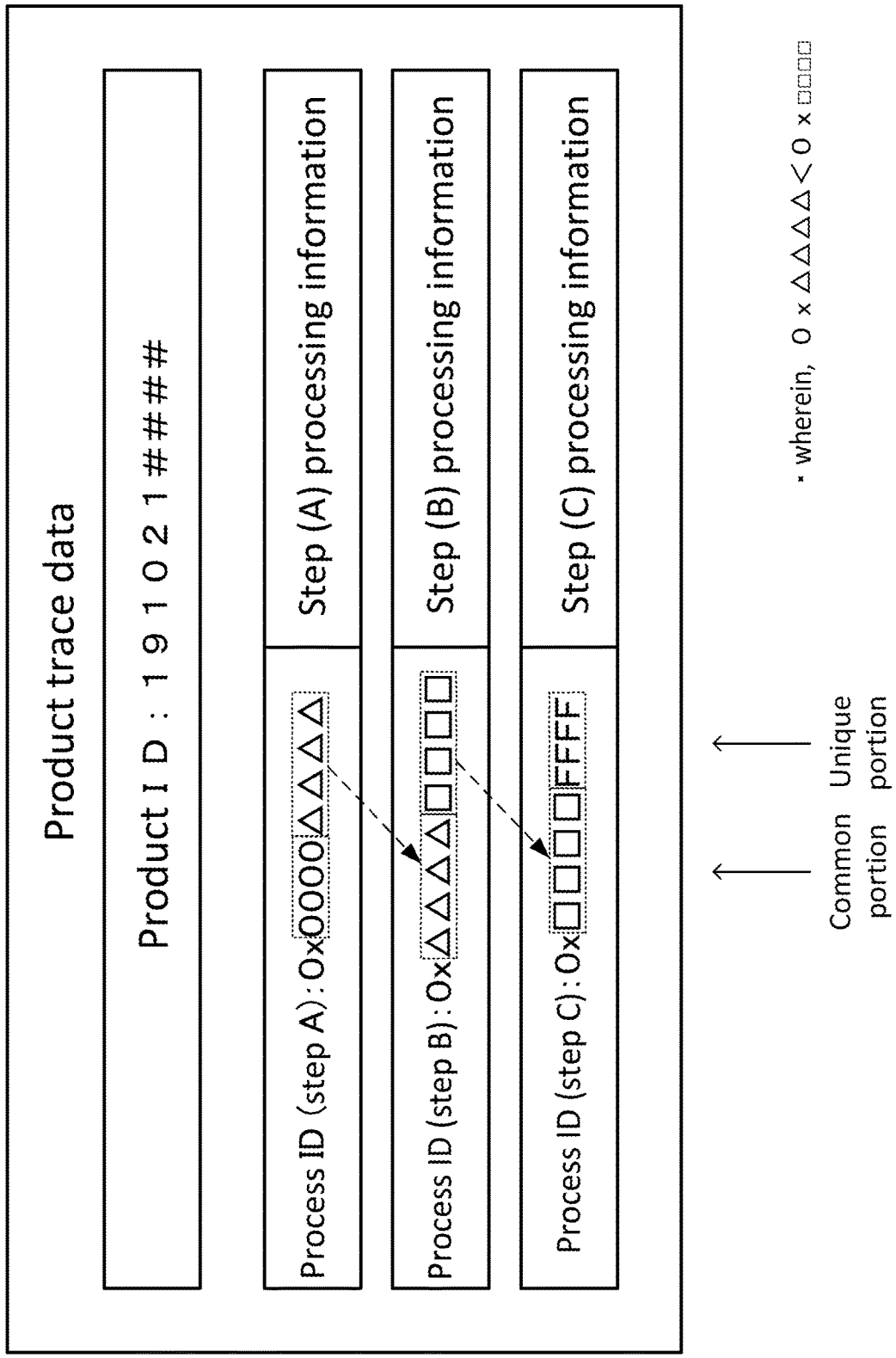
FIG. 3 is an explanatory diagram illustrating a specific example of a data content of product trace data.

With respect to the product manufacturing line 3 having the above structure, in the information collection system 100 of the present embodiment, a large amount of processing information generated by the processing apparatuses (31, 32, 33) is stored and managed in a form of product trace data collected in association with each individual product. Specifically, for example, as illustrated in FIG. 3, the content of this structured product trace data is structured to include one product ID and data pairs in a number corresponding to the number of the steps (3 in this example) required to manufacture the product, the data pairs each being formed of a combination of a process ID and processing information. The product ID is an identifier assigned to each individual product manufactured in the product manufacturing line 3, that is, an identifier assigned to an object. Further, the process ID is an identifier that is assigned to one processing operation itself executed with respect to a workpiece in each processing step, that is, an identifier that is assigned with respect to a generation opportunity of processing information. In the example of the present embodiment, as described above, the product trace data generation part 24 of the control apparatus 2 generates one set of product trace data by combining multiple processing information sets collected by the above information collection part 23, process IDs generated by the process ID generation part 26, and a product ID generated by the product ID generation part 27.

In the example illustrated in FIG. 3, when an individual product corresponding to the product trace data is the ####-th product manufactured on Oct. 21, 2019, "191021" of the manufacturing date (in a format of YYMMDD) is assigned as the first 6 digits of the data content of the product ID; the daily manufacturing number "####" is assigned as the last 4 digits of the data content of the product ID; and the entire product ID is generated as "191021####." The notation "####" in FIG. 3 does not mean that all "#" are the same numerical value, but means a meaningful numerical value (for example, a serial number/number, or the like) in the whole of four decimal digits. In this way, by generating a product ID as a combination of a manufacturing date and a daily manufacturing number, even when a large number of products are manufactured each day in the product manufacturing line 3, an individual product corresponding to a particular product ID can be uniquely identified among the products. Further, conversely, corresponding product trace data can be easily searched and acquired by also printing a product ID or corresponding bar code information or the like on a product itself.

Then, the product trace data identified based on a predetermined product ID contains a large number of processing information sets with data structures corresponding to part structures of the product or processing steps that the product has been subjected to during manufacture, and an anteroposterior relationship of the processing order is clarified based on the contents of the process IDs that respectively assigned corresponding to the large number of processing information sets. Specifically, as in the example illustrated in FIG. 3, when processing information is generated in the first step (step (A) in this example), the first 4 digits of the process ID assigned corresponding to processing information are generated as "0x0000." Further, when processing information is generated in the last step (step (C) in this example), the last 4 digits of the process ID assigned corresponding to the processing information are generated as "0xFFFF." In this way, of the process ID, the upper 4 digits are distinguished as a common portion, and the lower 4 digits are distinguished as a unique portion.

Then, when processing information is generated in a step (any one of the steps (A, B) in this example) other than the last step, the last 4-digit unique portion of the process ID assigned corresponding to the processing information is a sequential number in an ascending order and is uniquely generated for each detection of processing start information in the entire system. Further, regarding the uniqueness of the sequential number of the unique portion of the process ID, in the example of the present embodiment, the unique portion is in a range defined for each operating day of the product manufacturing line 3, that is, the value of the unique portion is initialized to "0x0001" every time the date changes. The notation "0xΔΔΔΔ" or "0x□□□□" in FIG. 3 does not mean that all "Δ" or "□" are the same numerical value, but means a meaningful numerical value (for example, a number or the like) in the whole of four hexadecimal digits. Further, as a comparison of the values in the example illustrated in FIG. 3, the relationship 0xΔΔΔΔ<0x□□□□ holds, that is, the processing order of the step for which the unique portion is 0xΔΔΔΔ is relatively early, and the processing order of the step for which the unique portion is 0x□□□□ is relatively later.

Further, when processing information is generated in a step (any one of the steps (B, C) in this example) other than the first step, for the first 4-digit common portion of the process ID assigned corresponding to the processing information, the unique portion of the process ID assigned to the step (corresponding to an upstream first processing step) executed immediately before this step with respect to an individual workpiece as a processing object in this step is directly assigned as the common portion of the process ID for this step (corresponding to a downstream second processing step) (see the dashed arrows in FIG. 3). Therefore, the process ID generation part 26 needs to grasp the relationship between the process IDs generated in the past in order to ensure the identity of the workpiece.

According to the method for generating a process ID described above, in the case where, in a combination of two process IDs, the common portion of one process ID is the same as the unique portion of the other process ID (see the dashed arrows in FIG. 3), it can be seen that the step of the one process ID is executed immediately after the step of the other process ID. As a result, processing information in each processing step actually executed can be identified and acquired by following a normal order or a reverse order of the processing order of each specific individual part. In other words, the processing information related to a specific processing step actually executed with respect to a specific individual part (workpiece) incorporated in a specific individual product can be uniquely identified and acquired when the multiple processing apparatuses (31, 32, 33) in the product manufacturing line 3 repeat processing operations many times every day.

4. Generation Process of Product Trace Data

Figure 4:
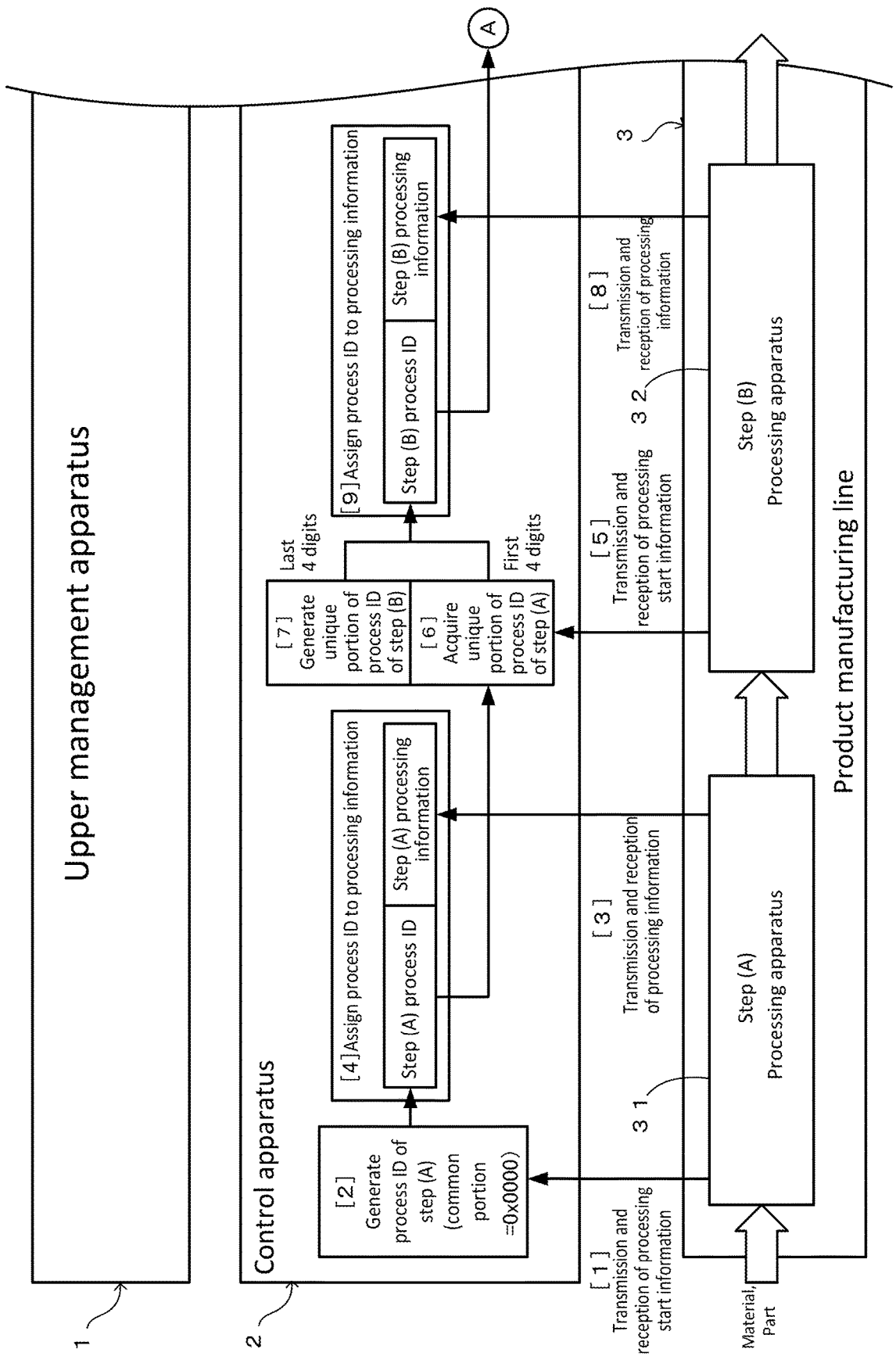
FIG. 4 is an explanatory diagram illustrating data generation processes that respectively correspond to the first two steps (A, B)
Figure 5:
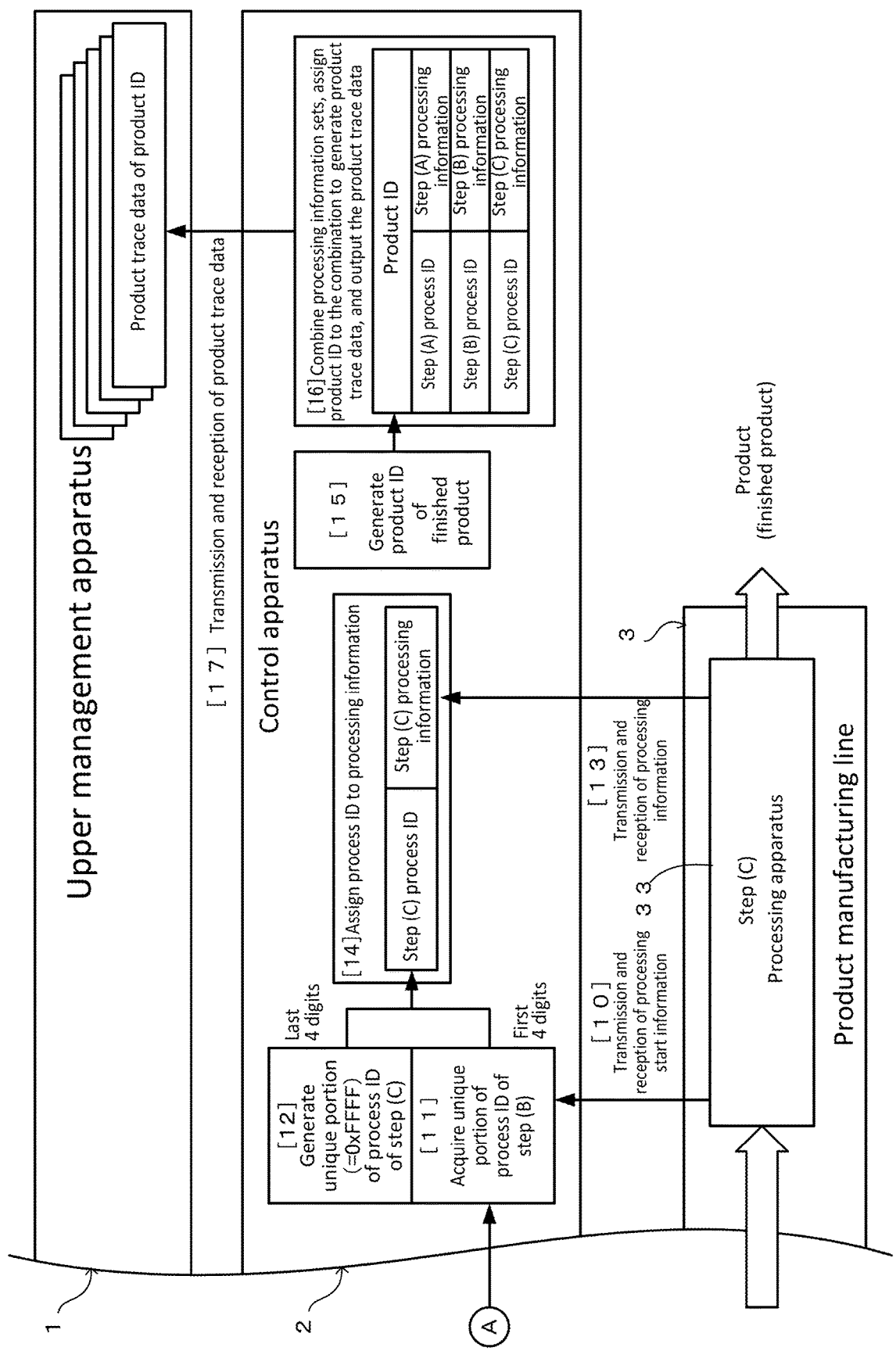
FIG. 5 is an explanatory diagram illustrating data generation processes that respectively corresponding to the last step (C) and the product trace data.

A specific generation process of the product trace data described above is described in detail below with reference to FIGS. 4 and 5. FIG. 4 illustrates data generation processes respectively corresponding to the first two steps (A, B) in this example. FIG. 5 illustrates data generation processes respectively corresponding to the subsequent last step (C) and the product trace data. Further, in FIGS. 4 and 5, in order to avoid complexity of illustration, all processes executed in the control apparatus 2 are illustrated as contents of procedures executed by the product trace data generation part 24, and illustrations of the other elements such as the machine control part 21, the start detection part 22, the information collection part 23, and the output part 25 are omitted.

First, in FIG. 4, when a material or a part as a workpiece is supplied to the product manufacturing line 3, first, the processing apparatus 31 of the step (A) detects the arrival of the workpiece with a sensor or the like and transmits, to the control apparatus 2, processing start information informing that the processing apparatus 31 of the step (A) is in a preparatory state before the start of a processing operation (process [1]). The control apparatus 2 (product trace data generation part 24) that has received the processing start information from the processing apparatus 31 of the step (A) generates the process ID of the step (A) in which "0x0000" is assigned to the first 4-digit common portion and a unique sequential number on that operating day is assigned to the last 4-digit unique portion (process [2]). On the other hand, the processing apparatus 31 of the step (A) that has started and completed the processing operation with respect to the workpiece transmits processing information related to the processing operation to the control apparatus 2 (process [3]). The control apparatus 2 assigns the process ID of the step (A) generated in the above process [2] to the received processing information by associating the process ID with the processing information (process [4]).

Next, when the workpiece that has been subjected to the processing of the step (A) reaches the processing apparatus 32 of the step (B), the processing apparatus 32 of the step (B) transmits, to the control apparatus 2, processing start information informing that the processing apparatus 32 of the step (B) is in a preparatory state before the start of a processing operation (process [5]). The control apparatus 2 that has received the processing start information from the processing apparatus 32 of the step (B) acquires only the last 4-digit unique portion of the process ID assigned corresponding to the immediately preceding step (A) in the above process [4] (process [6]). Further, the control apparatus 2 generates a last 4-digit unique portion of a process ID corresponding to the step (B) with a unique sequential number on that operating day (process [7]). On the other hand, the processing apparatus 32 of the step (B) that has started and completed the processing operation with respect to the workpiece transmits processing information related to the processing operation to the control apparatus 2 (process [8]). The control apparatus 2 generates the process ID corresponding to the step (B) as a combination that includes the value of the 4-digit portion acquired in the above process [6] as the first 4-digit common portion and the value of the 4-digit portion generated in the above process [7] as the last 4-digit unique portion, and assigns this process ID to the processing information received in the above process [8] by associating the process ID with the processing information (process [9]).

Next, when the workpiece that has been subjected to the processing of the step (B) reaches the processing apparatus 33 of the final step (C), the processing apparatus 33 of the step (C) transmits, to the control apparatus 2, processing start information informing that the processing apparatus 33 of the step (C) is in a preparatory state before the start of a processing operation (process [10]). The control apparatus 2 that has received the processing start information from the processing apparatus 33 of the step (C) acquires only the last 4-digit unique portion of the process ID assigned corresponding to the immediately preceding step (B) in the above process [9] (process [11]). Further, the control apparatus 2 generates a last 4-digit unique portion of a process ID corresponding to the step (C) with "0xFFFF" (process [12]). On the other hand, the processing apparatus 33 of the step (C) that has started and completed the processing operation with respect to the workpiece transmits processing information related to the processing operation to the control apparatus 2 (process [13]). The control apparatus 2 generates the process ID corresponding to the step (C) as a combination that includes the value of the 4-digit portion acquired in the above process [11] as the first 4-digit common portion and the value of the 4-digit portion generated in the above process [12] as the last 4-digit unique portion, and assigns this process ID to the processing information received in the above process [13] by associating the process ID with the processing information (process [14]).

As a result, one product is completed through all the processing steps. The control apparatus 2 generates a product ID corresponding to the completed individual product as a combination that includes the manufacturing date (in a format of YYMMDD) indicating the operating day as a first half portion and a daily manufacturing number which is a unique sequential number on that operating day as a last half portion (process [15]). Then, the control apparatus 2 generates product trace data corresponding to the product as a combination obtained by collecting all the processing information sets to which the process IDs are respectively assigned in the above process [4], process [9] and process [14] and assigning the product ID generated in the above process [15] to the collection (process [16]). The generated product trace data is output to the upper management apparatus 1 (the management part 11) and is recorded and managed (process [17]).

It is also possible that a management part corresponding to the above management part 11 is provided on the control apparatus 2 side, and in this case, the generated product trace data is recorded and managed by the management part of the control apparatus 2 itself.

Through the above generation processes, product trace data corresponding to one individual product is generated. Among these, the generation, transmission and reception of the processing start information or the processing information performed in each of the above process [1], process [3], process [5], process [8], process [10] and process [13] are functions that are normally executed by existing common processing apparatuses (31, 32, 33), and there is no new burden such as adding or changing application software. As a specific method of generating a unique portion of a process ID in each of the above process [2], process [7] and process [12] in the control apparatus 2, for example, an ID generation function (not illustrated in the drawings) that takes, as an argument, a unique portion of a process ID assigned corresponding to an immediately preceding step, a start flag of all the steps, a completion flag of all the steps, the number of combinations in merging of parts (to be described later), or the like may be used to generate a unique portion of a process ID corresponding to this step.

5. Control Flow

Figure 6:
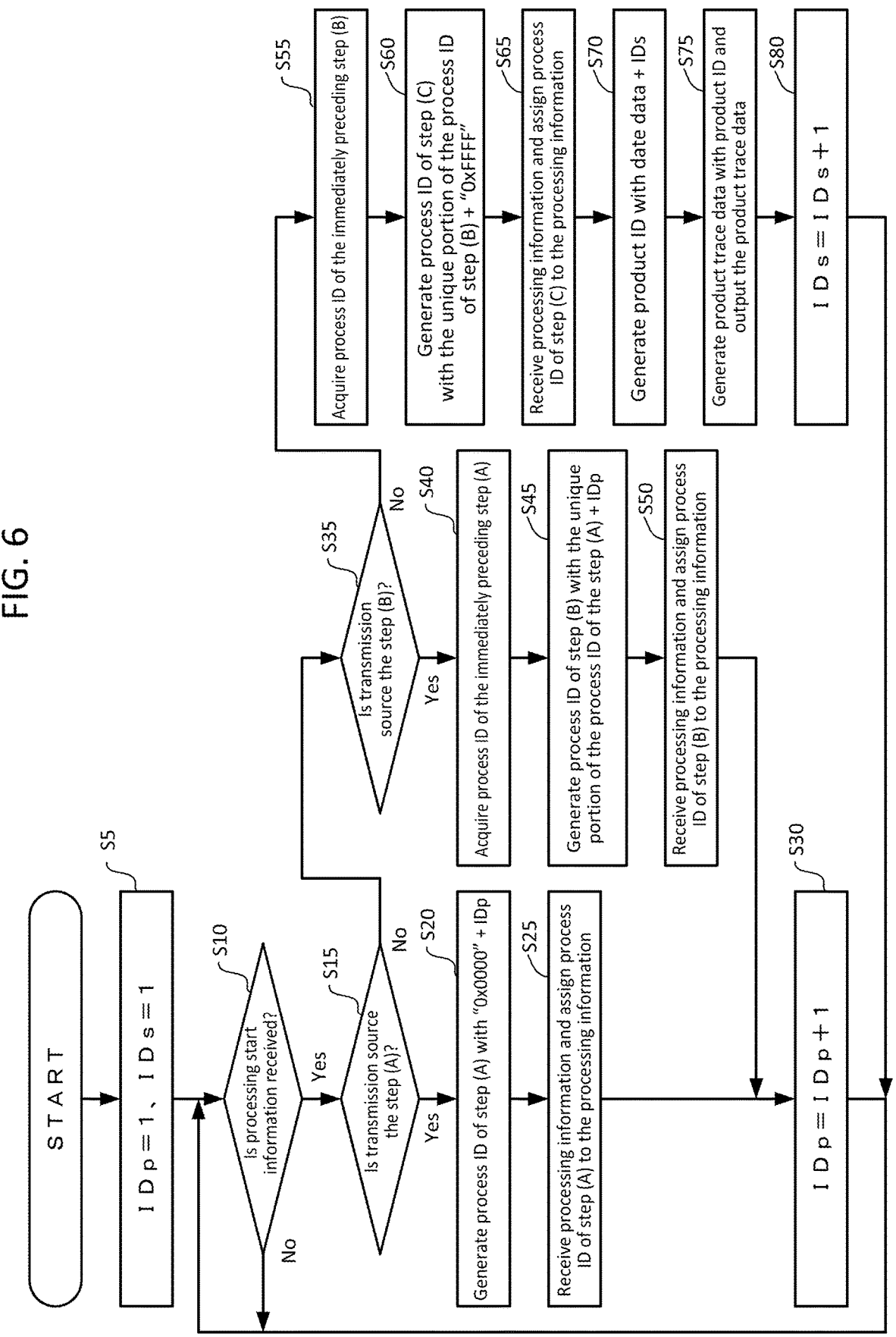
FIG. 6 is a flowchart illustrating control procedures executed by a CPU of the control apparatus in order to realize a method for generating the product trace data.

FIG. 6 illustrates a flowchart of control procedures executed by the CPU of the control apparatus 2 in order to realize the method for generating the product trace data described above. Execution of the procedures of the flowchart illustrated in FIG. 6 starts at the first start-up of an operating day after a date change.

First, in Step S5, the CPU of the control apparatus 2 initializes the values of IDp, which is a variable corresponding to the unique portion of a process ID, and IDs, which is a variable corresponding to the daily manufacturing number of a product ID, to 1.

Next, the processing proceeds to Step S10, in which the CPU of the control apparatus 2 waits in a loop until processing start information is received from one of the processing apparatuses (31, 32, 33). When the processing start information is received, the processing proceeds to Step S15.

In Step S15, the CPU of the control apparatus 2 determines whether or not the transmission source of the processing start information received in the above Step S10 is the processing apparatus 31 of the step (A). When the transmission source of the processing start information is the processing apparatus 31 of the step (A), the determination is satisfied (S15: YES), and the processing proceeds to Step S20.

In Step S20, the CPU of the control apparatus 2 generates the process ID of the step (A) as a combination that includes "0x0000" as a first 4-digit portion and the value of the variable IDp at the time as a last 4-digit portion.

Next, the processing proceeds to Step S25, in which the CPU of the control apparatus 2 receives processing information from the processing apparatus 31 of the step (A) and assigns the process ID of the step (A) generated in the above Step S20 to the processing information.

Next, the processing proceeds to Step S30, in which the CPU of the control apparatus 2 adds 1 to the value of the variable IDp. Then, the processing returns to Step S10 and the same procedures are repeated.

Further, on the other hand, in the determination of the above Step S15, when the transmission source of the processing start information is not the processing apparatus 31 of the step (A), the determination is not satisfied (S15: NO), and the processing proceeds to Step S35.

In Step S35, the CPU of the control apparatus 2 determines whether or not the transmission source of the processing start information received in the above Step S10 is the processing apparatus 32 of the step (B). When the transmission source of the processing start information is the processing apparatus 32 of the step (B), the determination is satisfied (S35: YES), and the processing proceeds to Step S40.

In Step S40, the CPU of the control apparatus 2 acquires the process ID (the unique portion thereof) generated in the immediately preceding step (A) corresponding to the workpiece which is the processing target of the step (B) at the time.

Next, the processing proceeds to Step S45, in which the CPU of the control apparatus 2 generates the process ID of the step (B) as a combination that includes the unique portion of the process ID of the step (A) acquired in the above Step S40 as a first 4-digit portion and the value of the variable IDp at the time as a last 4-digit portion.

Next, the processing proceeds to Step S50, in which the CPU of the control apparatus 2 receives processing information from the processing apparatus 32 of the step (B) and assigns the process ID of the step (B) generated in the above Step S45 to the processing information. Then, the processing proceeds to Step S30.

Further, on the other hand, in the determination of the above Step S35, when the transmission source of the processing start information is not the processing apparatus 32 of the step (B), in other words, when the transmission source is the processing apparatus 33 of the step (C), the determination is not satisfied (S35: NO), and the processing proceeds to Step S55.

In Step S55, the CPU of the control apparatus 2 acquires the process ID (the unique portion thereof) generated in the immediately preceding step (B) corresponding to the workpiece which is the processing target of the step (C) at the time.

Next, the processing proceeds to Step S60, in which the CPU of the control apparatus 2 generates the process ID of the step (C) as a combination that includes the unique portion of the process ID of the step (B) acquired in the above Step S55 as a first 4-digit portion and "0xFFFF" as a last 4-digit portion.

Next, the processing proceeds to Step S65, in which the CPU of the control apparatus 2 receives processing information from the processing apparatus 33 of the step (C) and assigns the process ID of the step (C) generated in the above Step S60 to the processing information.

Next, the processing proceeds to Step S70, in which the CPU of the control apparatus 2 generates the product ID corresponding to the completed individual product as a combination that includes the date (in a format of YYMMDD) of that operating day as a first half portion and the value of the variable IDs at the time as a last half portion.

Next, the processing proceeds to Step S75, in which the CPU of the control apparatus 2 generates product trace data as a combination obtained by collecting the three processing information sets to which the process IDs of the steps (A, B, C) of the above Step S25, Step S50, and Step S65 are respectively assigned and assigning the product ID generated in the above Step S70 to the collection, and outputs the product trace data to the upper management apparatus 1.

Next, the processing proceeds to Step S80, in which the CPU of the control apparatus 2 adds 1 to the value of the variable IDs. Then, the processing returns to Step S10 and the same procedures are repeated.

In the above, the procedures of the entire flowchart illustrated in FIG. 6 correspond to the product trace data generation part 24, among which, the procedures of the above Step S20, Step S45 and Step S60 correspond to the process ID generation part 26, and the procedure of Step S70 corresponds to the product ID generation part 27.

6. Case Where Merging of Parts is Present in a Processing Step

Figure 7A:
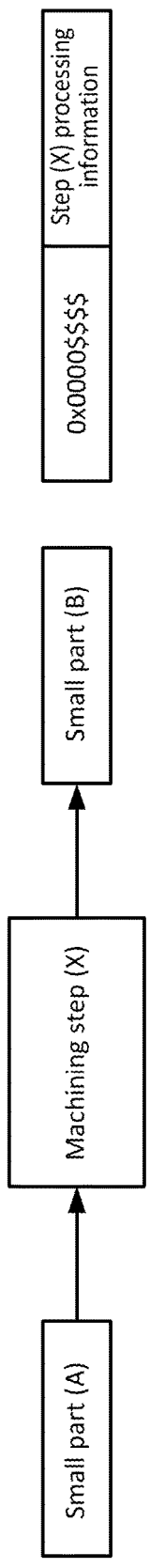
FIGS. 7(a)-7(c) are explanatory diagrams illustrating examples of processing steps and corresponding generated process IDs in a case where merging of parts is present.
Figure 7B:
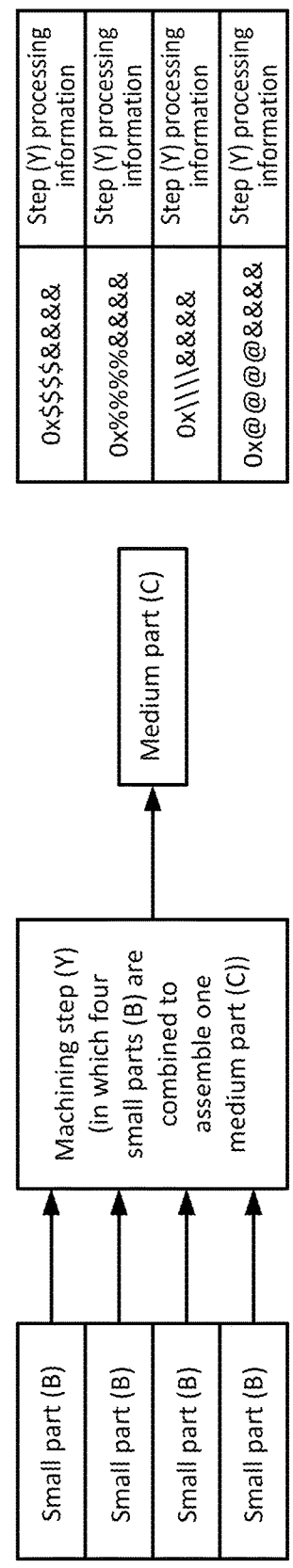
Figure 7C:
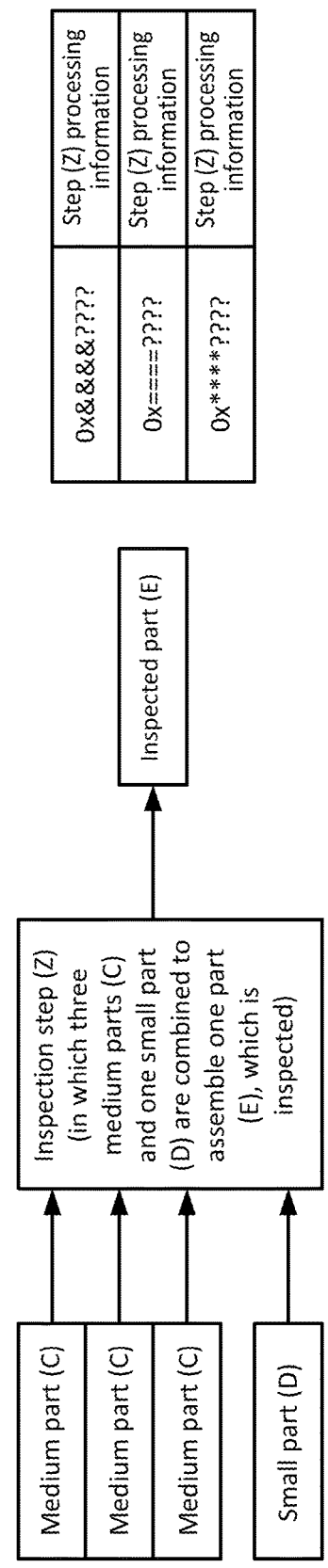

In the above description, the processing steps in the product manufacturing line 3 are described using an example in which, as illustrated in FIG. 2 above, the multiple steps (A, B, C) are sequentially executed. However, for example, as illustrated in FIG. 7(a)-7(c), among processing steps, there may be a step in which parts are merged. Specifically, three steps including a machining step (X) illustrated in FIG. 7(a), a machining step (Y) illustrated in FIG. 7(b), and an inspection step (Z) illustrated in FIG. 7(c) are sequentially executed. In the first machining step (X), a machining operation (processing operation) is executed with respect to one small part (A), and thereby, one small part (B) is produced.

However, in the next machining step (Y), four small parts (B) which are each produced in the above machining step (X) are combined to assemble one medium part (C). Further, in the next inspection step (Z), three medium parts (C) which are each assembled in the above machining step (Y) and one small part (D) separately prepared are combined and assembled, and then, the entire resulting product is inspected. When there is a part merging step, such as the machining step (Y) or the inspection step (Z), in which multiple parts produced in previous steps or newly prepared parts are combined, a process ID generation method that takes into account a mode of the merging is preferably applied.

For example, in case of the machining step (Y), since the four small parts (B) are used to produce the one medium part (C), four processing information sets are also generated from the processing apparatus at the time. However, since the step itself should be regarded as one step, for the process IDs generated corresponding to the machining step (Y), four process IDs of which the unique portions are assigned with the same sequential number ("0x&&&&" in the example illustrated in FIG. 7(b)) are respectively generated corresponding to the processing information sets of the four small parts (B). The common portion of the process ID of each of the small parts (B) is assigned with the unique portion of the process ID assigned in the immediately preceding machining step (X) of the each of the small parts (B). As a result, association of each of the small parts (B) with respect to the immediately preceding step is ensured. Further, in the case of the inspection step (Z), since separate processing is not performed with respect to the small part (D), it is sufficient to generate only process IDs that respectively correspond to the processing information sets of the three medium parts (C).

The notation "0x$$$$," "0x %%%%," "0xYYYY," "0x@@@@," "0x&&&&," "0x====," "0x****" or "0x????" in FIGS. 7(a)-7(c) does not mean that all "$," "%," "Y," "@," "&," "=," "*" or "?" are the same numerical value, but means a meaningful numerical value (for example, a number or the like) in the whole of four hexadecimal digits. Further, as a comparison of the values in the example illustrated in FIGS. 7(a)-7(c), the relationship 0x$$$$<0x %%%%<0xYYYY<0x@@@@<0x&&&&<0x====<0x****<0x???? holds. That is, a smaller value of the unique portion means a relatively earlier processing order of the step, and a larger value of the unique portion means a relatively later processing order of the step.

7. Effects of the Present Embodiment

As described above, in the information collection system 100 of the present embodiment, each of the multiple processing apparatuses (31, 32, 33) controlled by the machine control part 21 transmits the processing information related to the processing step executed by itself. The multiple processing information sets from the multiple processing apparatuses (31, 32, 33) are collected by the information collection part 23. A process ID as a link identifier that enables a linkage between the multiple processing steps related to one product is assigned to the collected multiple processing information sets by the product trace data generation part 24, and thereby, the multiple processing information sets are associated with each other. In this way, by outputting the multiple processing information sets that are associated with each other and are related to one product, traceability of the one product manufactured through the processing steps can be managed.

As described above, in the present embodiment, in managing the traceability, a series of processes such as associating multiple processing information sets by assigning a process ID is performed only by the information collection part 23 and the product trace data generation part 24 on the control apparatus 2 side, and, the processing apparatuses (31, 32, 33) that execute the processing steps only need to transmit the corresponding processing information sets. As a result, even when an embodiment of the present invention is applied to an existing product manufacturing line 3, a new burden such as addition or modification of application software of the processing apparatuses (31, 32, 33) does not occur.

Further, in the present embodiment, in particular, the multiple processing information sets that are associated with each other by the product trace data generation part 24 and are related to one product are output from the output part 25 and are managed in the management part 11 of the upper management apparatus 1. As a result, the traceability with respect to one product manufactured through the processing steps can be reliably managed.

Further, in the present embodiment, in particular, the product trace data generation part 24 includes the process ID generation part 26 that respectively generates multiple process IDs corresponding to the multiple processing steps, and the multiple process IDs generated by the process ID generation part 26 are respectively assigned to the corresponding multiple processing information sets. As a result, the process IDs are respectively assigned by the product trace data generation part 24 to the processing steps that are respectively executed by the multiple processing apparatuses (31, 32, 33). As a result, the multiple processing information sets related to the multiple processing steps can be associated with each other by using the corresponding process IDs.

A form of assigning the process IDs to the multiple processing information sets is not limited to a form of directly assigning the process IDs as in the example of the above embodiment. In addition, association between multiple processing information sets can also be ensured by applying an indirect assigning form in which separately generated unique processing information IDs are assigned to the multiple processing information sets and correspondence between the process IDs and the processing information IDs are recorded using a table or the like (not particularly illustrated in the drawings).

Further, in the present embodiment, in particular, the multiple process IDs each include a common portion that is commonly included in process IDs of two adjacent processing steps in the processing order, and a unique portion unique to each processing step. For example, for the two processing steps (B, C) that are adjacent to each other in the processing order illustrated in FIG. 2 above, the process ID generation part 26 uses the unique portion of the process ID generated for the upstream step (B) as the common portion of the process ID of the downstream step (C).

As a result, in a process ID corresponding to one processing step, the unique portion indicates which step the processing step is, and the common portion indicates a relation with another processing step having the common portion and thus enables a linkage between the steps. Further, the unique portion of the process ID corresponding to the upstream processing step (B) is used as the common portion of the processing step (C) in a manner of being passed downstream. As a result, the process ID of the processing step (B) and the process ID of the processing step (C) can be reliably linked.

Further, in the present embodiment, in particular, the start detection part 22 is provided that detects the start of the processing in or a preparatory state of each of the processing apparatuses (31, 32, 33), and, when the start detection part 22 detects the start of the processing in or the preparatory state of one of the processing apparatuses (31, 32, 33), the process ID generation part 26 generates the corresponding process ID. In this way, in the present embodiment, when the processing step of each of the processing apparatuses (31, 32, 33) is executed, that the processing has actually started is detected by the start detection part 22. Then, when the start of the processing is detected, the process ID corresponding to the processing step is generated by the process ID generation part 26. As a result, a reliable association between the processing step and the process ID can be achieved.

A trigger for the process ID generation part 26 to generate the process ID is not limited to the detection of the processing start information from the processing apparatuses (31, 32, 33) via the start detection part 22. In addition, an output of a control command from the machine control part 21 on the control apparatus 2 side to each of the processing apparatuses (31, 32, 33) to start a processing operation thereof may also be used as trigger for the process ID generation part 26 to generate a process ID corresponding to the processing operation (see FIG. 8 described below).

Further, in the example of the above embodiment, the product trace data is generated on the control apparatus 2 side by combining the multiple processing information sets, to which the process IDs are respectively assigned, and the product ID. However, the present invention is not limited to this. In addition, it is also possible that, in the process [4], the process [9] and the process [12] on the control apparatus 2 side illustrated in FIGS. 4 and 5 above, the processing information sets to which the process IDs have been respectively assigned are directly output to the upper management apparatus 1, and are combined on the upper management apparatus 1 side to generate the product trace data. In this case, the product ID may be generated on the control apparatus 2 side and output to the upper management apparatus 1, or the product ID may be generated on the upper management apparatus 1 side. In addition, various other divisions of processes between the control apparatus 2 and the upper management apparatus 1 are possible.

8. Modified Embodiments

In the above, an embodiment is described in detail with reference to the accompanying drawings. However, the scope of the technical ideas described in the appended claims is not limited to the embodiment described herein. It is obvious that, for a person of ordinary knowledge in the technical field to which the present embodiment belongs, within the scope of the technical ideas, various variations, modifications, combinations and the like can be conceived. Therefore, any technology achieved based on these variations, modifications, combinations and the like are naturally included in the scope of the technical ideas.

8-1. Case Where Merging of Parts is Absent in the Processing Steps

For example, as illustrated in FIG. 2 above, when there is no merging of parts in all the processing steps in the product manufacturing line 3, that is, when one product is manufactured by only continuously subjecting one workpiece supplied to the product manufacturing line 3 to multiple processing steps, it is possible to associate all the processing information sets with only one product ID without generating any process ID.

Figure 8:
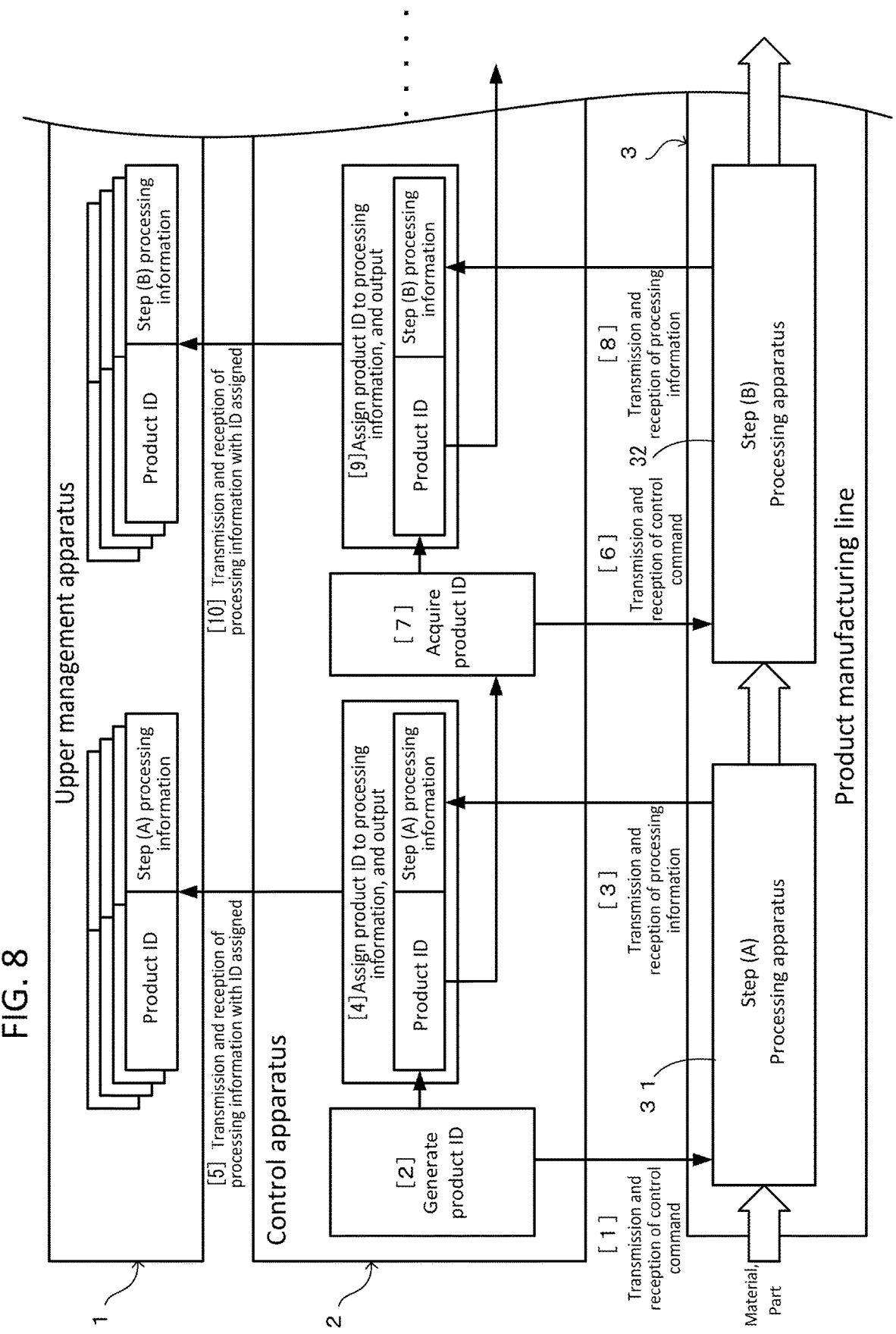
FIG. 8 is an explanatory diagram illustrating a data generation process in a case where processing information sets are associated with each other using only a product ID without assigning process IDs in processing steps in which merging of parts is absent.

Specifically, as illustrated in FIG. 8 which corresponds to FIG. 4 above, when the control apparatus 2 (the machine control part 21 omitted in FIG. 8) outputs, to the processing apparatus 31 of the first step (A), a control command instructing the start of a processing operation thereof (process [1]), the product ID generation part 27 (corresponds to a first product ID generation part) generates a product ID with a unique sequential number on that operating day (process [2]). After that, when processing information is received from the processing apparatus 31 of the step (A) (process [3]), the product ID is directly assigned to the processing information and the combination is directly output to the upper management apparatus 1 (process [3]). Then, every time a control command instructing the start of a processing operation is output with respect to each subsequent step, a process is repeated in which the corresponding product ID is acquired and is assigned to the processing information of the step, and the combination is output to the upper management apparatus 1. As a result, all the processing information sets of the steps up to the final step can be associated in an integrated way with one product ID. Illustration of the processes corresponding to those of FIG. 5 is omitted.

As described above, in the information collection system 100 of this modified embodiment, the product ID generation part 27 generates one product ID corresponding to one product, and thereby, the multiple processing information sets that are respectively related to the multiple processing steps can be associated with each other using the one product ID. In particular, in manufacturing a product, in the case of one flow in which multiple processing steps are continuously executed (rather than that multiple flows of processing steps merge along the way or one flow branches into multiple flows), it is effective since simple management using only one product ID can be performed.

Further, in the present embodiment, in particular, one product ID is associated with the processing information sets that are respectively related to all the processing steps from the first processing step to the last processing step among the multiple processing steps. As a result, when one product is manufactured, all the processing information sets that are respectively related to all the processing steps can be associated with each other using one product ID.

As in the example of the above embodiment, the control apparatus 2 has the start detection part 22, and, when the start detection part 22 detects the start of the processing in the processing apparatus 31 corresponding to the first processing step among the multiple processing steps, the product ID generation part 27 may generate a product ID (this is not particularly illustrated in the drawings). As a result, when a product is manufactured, the corresponding product ID is generated by the product ID generation part 27 when the first processing step among the multiple processing steps is started. As a result, the processing information of each processing step can be reliably associated with the product ID.

8-2. Case Where Process IDs are Managed Using a Table

Further, similarly, in the case where merging of parts is absent in all the processing steps, in addition, the generation and management of the process IDs corresponding to the steps are performed using a dedicated table, and thereby, data contents of the process IDs themselves can be simplified. Specifically, as illustrated in FIG. 9, a two-dimensional matrix table, which is arranged such that rows thereof are associated with individual products and columns thereof are associated with product IDs and steps, is created in advance as a process ID management table in a predetermined storage area (corresponding to a predetermined memory area) in the above RAM (corresponding to a storage part.

Then, the process ID generation part 26 (corresponding to a second process ID generation part) records process IDs generated as unique sequential numbers on an operating day at corresponding matrix positions in a product manufacturing order (that is, a row order in the table) and in a processing order (that is, a column order in the table) every time a step is executed. Then, when a process ID is recorded in a column position of the table corresponding to the final step (the step (C) in this example), the manufacture of the product is completed, and the product ID generation part 27 (corresponding to a second product ID generation part) generates a product ID corresponding to that row and records the product ID at a column position for a product ID item (the leftmost column in the example illustrated in FIG. 9). In this way, multiple process IDs recorded in the process ID management table are associated with the same product ID and a common row, and the association between the process IDs can be easily ensured. Then, the process IDs of the columns in a row in which the product ID has been recorded may be directly or indirectly respectively assigned to the corresponding processing information sets and the resulting combination may be output to the upper management apparatus 1.

Item names ("product ID," "step (A) process ID," "step (B) process ID," "step (C) process ID") of the columns illustrated in the uppermost row in the process ID management table illustrated in FIG. 9 each correspond to an area identifier in the claims, a procedure assigning each of these area identifiers corresponds to a first assigning part in the claims, and a procedure recording each process ID as a link identifier at a corresponding matrix position in the table corresponds to a second assigning part in the claims.

As described above, in the information collection system 100 of the present modified embodiment, the RAM has a predetermined memory area for storing the process ID management table. Then, one product ID corresponding to one product is generated by the product ID generation part 27, and the product ID is arranged in one area in the process ID management table corresponding to an item name of a column. On the other hand, multiple process IDs that respectively correspond to the multiple processing steps are generated by the process ID generation part 26, and the process IDs are respectively arranged at the same column positions as the item names of the corresponding steps. As a result, in the memory area of the process ID management table, the product ID and the multiple process IDs corresponding to the product ID are arranged in a common row. As a result, for example, multiple sets that each include a product ID and multiple process IDs arranged in a common row are collectively output, and thereby, for each of the sets, the multiple processing information sets of the multiple processing steps corresponding to the multiple process IDs included in the each of the sets can be associated with each other together with the above product ID.

Further, in the present embodiment, in particular, at the start of each of the multiple processing steps, the corresponding process IDs are each sequentially arranged in one area in the memory area of the process ID management table. After that, when the process ID corresponding to the last processing step among the multiple processing steps is arranged in one area of the memory area of the above process ID management table, one product ID corresponding to one product manufactured by the multiple processing steps is arranged in the column corresponding to the product ID item name in the above process ID management table. As a result, the arrangement of the product ID and the corresponding multiple process IDs in a common row can be smoothly and reliably performed.

9. Example of a Hardware Structure of the Control Apparatus

Figure 10:
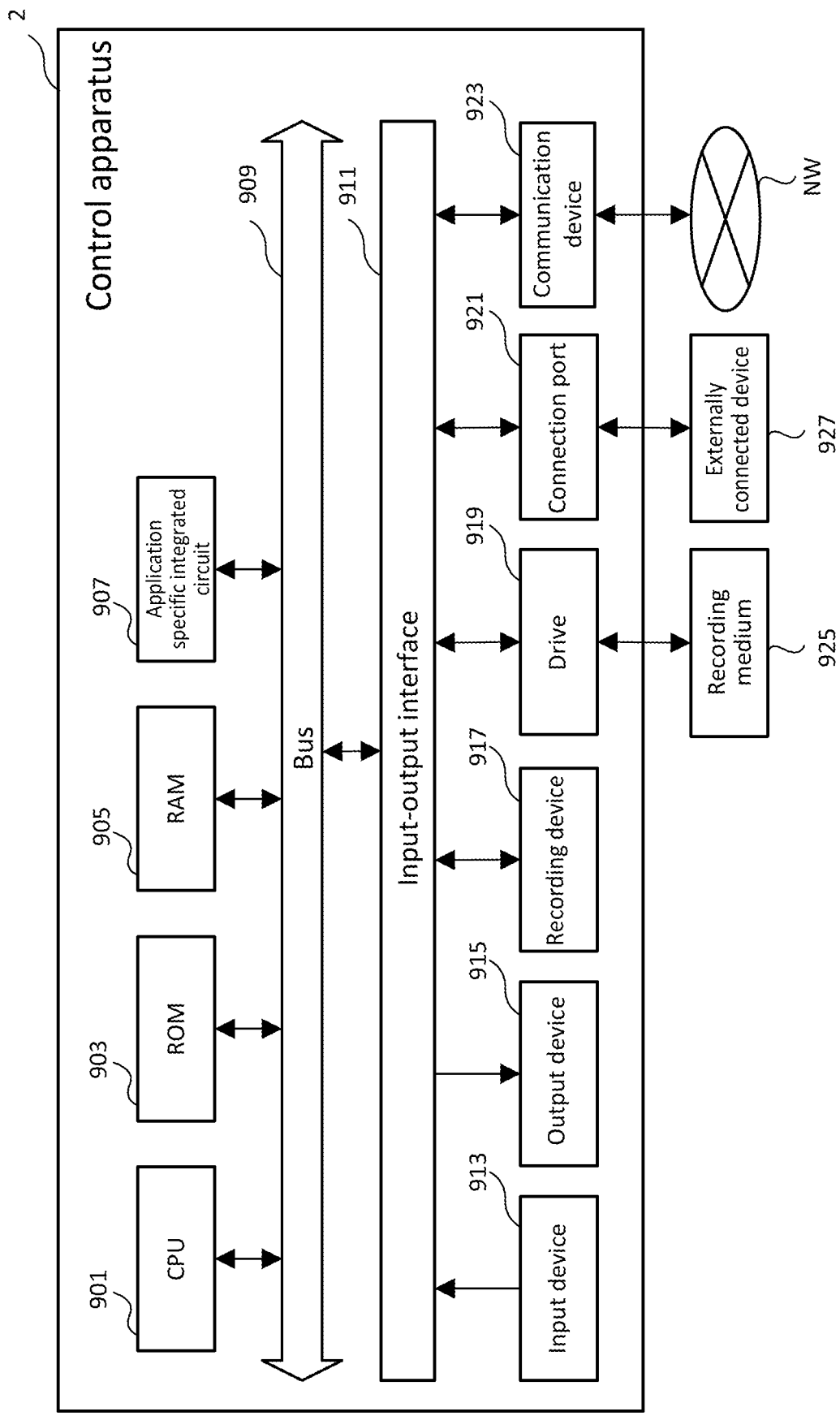
FIG. 10 is a block diagram illustrating an example of a hardware structure of the control apparatus.

Next, with reference to FIG. 10, an example of a hardware structure of the control apparatus 2 that realizes the processing by the machine control part 21, the start detection part 22, the information collection part 23, the product trace data generation part 24 (the process ID generation part 26 and the product ID generation part 27), the output part 25, or the like, which are implemented by a program executed by the CPU 901 described above, is described.

As illustrated in FIG. 10, the control apparatus 2 includes, for example, the CPU 901, a ROM 903, a RAM 905, an application specific integrated circuit 907 such as an ASIC or an FPGA built for a specific application, an input device 913, an output device 915, a recording device 917, a drive 919, a connection port 921, and a communication device 923. These structural elements are connected via a bus 909 or an input-output interface 911 in a manner capable of transmitting a signal between each other.

The program can be recorded in, for example, the ROM 903, the RAM 905, the recording device 917, or the like.

Further, the program can be temporarily or permanently recorded in a removable recording medium 925 such as a magnetic disk (such as a flexible disk), an optical disk (such as various CD/MO disk/DVD), or a semiconductor memory. Such a recording medium 925 can also be provided as so-called package software. In this case, the program recorded in the recording medium 925 may be read out by the drive 919 and recorded in the recording device 917 via the input-output interface 911, the bus 909, or the like.

Further, the program can also be recorded in, for example, a download site, another computer, another recording device, or the like (not illustrated in the drawings). In this case, the program is transmitted via a network (NW) such as an LAN or the Internet, and the communication device 923 receives the program. Then, the program received by the communication device 923 may be recorded in the recording device 917 via the input-output interface 911, the bus 909 or the like.

Further, the program can also be recorded, for example, in an appropriate externally connected device 927. In this case, the program may be transmitted via the appropriate connection port 921 and recorded in the recording device 917 via the input-output interface 911, the bus 909, or the like.

Then, the CPU 901 executes various processes according to the program recorded in the recording device 917, and thereby, realizes the processing by the machine control part 21, the start detection part 22, the information collection part 23, the product trace data generation part 24 (the process ID generation part 26 and the product ID generation part 27), the output part 25, or the like. In this case, for example, the CPU 901 may directly read out the program from the recording device 917 and execute the program, or may load the program into the RAM 905 and then execute the program. Further, for example, when the CPU 901 receives the program via the communication device 923, the drive 919, or the connection port 921, the received program may be directly executed without being recorded in the recording device 917.

Further, when necessary, for example, the CPU 901 may perform various kinds of processing based on a signal or information input from the input device 913 such as a mouse, a keyboard, a microphone (not illustrated in the drawings), or the like.

Then, for example, the CPU 901 may output a result resulting from executing the above processing from the output device 915 such as a display device or an audio output device. Further, when necessary, the CPU 901 may transmit the processing result via the communication device 923 or the connection port 921, or may record the processing result in the recording device 917 or the recording medium 925.

In the above description, when there is a description such as "vertical," "parallel," "flat surface," or the like, the description is not in a strict sense. That is, "vertical," "parallel" or "flat surface" means "substantially vertical," "substantially parallel" or "substantially flat surface," when tolerances and errors in design and in manufacturing are within allowed ranges.

Further, in the above description, when there is a description such as that an external dimension or size is "identical," "equal," "different," or the like, the description is not in a strict sense. That is, "identical," "equal" or "different" means "substantially identical," "substantially equal" or "substantially different" when tolerances and errors in design and in manufacturing are within allowed ranges.

However, unlike the above, for example, when there is a description about a value as a predetermined decision criterion or a value for specifying a range, such as a threshold or a reference value, for these values, a description such as "identical," "equal," "different," or the like is in a strict sense.

When the above conventional technology is applied to an existing manufacturing line to manage traceability, on the manufacturing line side, it is necessary for a processing apparatus to newly have a function of receiving an ID and a function of attaching processing information to the ID and transmitting the resulting combination back to a control apparatus. As a result, a new burden such as addition or modification of application software on the processing apparatus side occurs.

An information collection system for industrial equipment, a control apparatus for industrial equipment, and an information collection method for industrial equipment according to embodiments of the present invention allow traceability to be managed without requiring a new burden on a manufacturing line side where processing apparatuses are provided.

According to one aspect of the present invention, an information collection system for industrial equipment is applied that includes: a control part controlling multiple processing apparatuses that each execute a predetermined process with respect to at least one workpiece; a collection part that respectively collect, from the multiple processing apparatuses, multiple processing information sets that are respectively related to multiple processing steps executed by the multiple processing apparatuses until one corresponding product is manufactured from the at least one workpiece; and an association part that associates the multiple processing information sets collected by the collection part by assigning to the multiple processing information sets a link identifier that enables a linkage between the multiple processing steps related to the one product.

Further, according to another aspect of the present invention, a control apparatus for industrial equipment is applied that controls multiple processing apparatuses that each execute a predetermined process with respect to at least one workpiece, the control apparatus including: a collection part that respectively collect, from the multiple processing apparatuses, multiple processing information sets that are respectively related to multiple processing steps executed by the multiple processing apparatuses until one corresponding product is manufactured from the at least one workpiece; and an association part that associates the multiple processing information sets collected by the collection part by assigning to the multiple processing information sets a link identifier that enables a linkage between the multiple processing steps related to the one product.

Further, according to another aspect of the present invention, an information collection method for industrial equipment is applied that is executed in an information collection system for industrial equipment, the information collection system having a control part that controls multiple processing apparatuses that each execute a predetermined process with respect to at least one workpiece, the information collection method including: respectively collecting, from the multiple processing apparatuses, multiple processing information sets that are respectively related to multiple processing steps executed by the multiple processing apparatuses until one corresponding product is manufactured from the at least one workpiece; and associating the collected multiple processing information sets by assigning to the multiple processing information sets a link identifier that enables linkage between the multiple processing steps related to the one product.

According to an embodiment of the present invention, traceability can be managed without requiring a new burden on a manufacturing line side where processing apparatuses are provided.

Obviously, numerous modifications and variations of the present invention are possible in light of the above teachings. It is therefore to be understood that within the scope of the appended claims, the invention may be practiced otherwise than as specifically described herein.

What is claimed is:

1. An information system for industrial equipment, comprising:
processing circuitry configured to
control a plurality of processing apparatuses that each execute a predetermined process with respect to at least one workpiece,
respectively collect, from the plurality of processing apparatuses, a plurality of processing information sets that are respectively related to a plurality of processing steps executed by the plurality of processing apparatuses until one corresponding product is manufactured from the at least one workpiece, and associate the plurality of processing information sets by assigning to the plurality of processing information sets a link identifier that permits a linkage between respective steps of the plurality of processing steps related to the one corresponding product, the link identifier being formed by a plurality of process IDs, each of the plurality of process IDs including a common portion that is commonly included in process IDs of two adjacent processing steps, and a unique portion unique to each processing step, and the plurality of process IDs being generated using the unique portion of a first process ID generated for an upstream first processing step as the common portion of a second process ID generated for a downstream second processing step, the upstream first processing step and the downstream second processing step being two mutually adjacent processing steps, such that the unique portion of the first process ID is same as the common portion of the second process ID.

2. The information system for industrial equipment according to claim 1, wherein the processing circuitry is further configured to output the plurality of processing information sets that are related to the one corresponding product and are associated with each other, and manage the plurality of processing information sets.

3. The information system for industrial equipment according to claim 1, wherein the processing circuitry is further configured to associate the plurality of processing information set by being configured to generate the plurality of process IDs that form the link identifier and respectively correspond to the plurality of processing steps, and respectively assign the plurality of process IDs to the plurality of processing information sets.

4. The information system for industrial equipment according to claim 3, wherein the processing circuitry is further configured to detect a start of processing in or a preparatory state of each of the processing apparatuses, and generate the corresponding process ID when the start of the processing in or the preparatory state of one of the processing apparatuses is detected.

5. The information system for industrial equipment according to claim 1, wherein the processing circuitry is further configured to associate the plurality of processing information set by being configured to generate one product ID as the link identifier with respect to the one corresponding product, and associate the one product ID with the plurality of processing information sets.

6. The information system for industrial equipment according to claim 5, wherein the processing circuitry is further configured to associate the plurality of processing information set by being configured to associate the one product ID with the processing information sets that are respectively related to all the processing steps from a first processing step to a last processing step of the plurality of processing steps.

7. The information system for industrial equipment according to claim 5, wherein the processing circuitry is further configured to detect a start of processing in each of the processing apparatuses, and generate the product ID when the start of the processing in the processing apparatus corresponding to a first processing step among the plurality of processing steps is detected.

8. The information system for industrial equipment according to claim 1, further comprising:
a storage having a predetermined memory area,
wherein the processing circuitry is further configured to associate the plurality of processing information set by being configured to generate one product ID corresponding to the one product, assign as the link identifier in a first assigning and with respect to the product ID, an area identifier indicating an arrangement in one area included in the memory area, generate the plurality of process IDs respectively corresponding to the plurality of processing steps, and assign as a second link identifier in a second assigning and with respect to the plurality of process IDs, the area identifier having a same content as that assigned in the first assigning.

9. The information system for industrial equipment according to claim 8, wherein the processing circuitry is further configured to associate the plurality of processing information set by being configured to, in the second assigning, assign, at the start of each of the plurality of processing steps, the area identifier indicating the arrangement in the one area to the corresponding process ID, and assign, when the area identifier indicating the arrangement in the one area with respect to the process ID corresponding to a final processing step among the plurality of processing steps is assigned, the area identifier indicating the arrangement in the one area with respect to the corresponding product ID.

10. A control apparatus for industrial equipment, comprising:
processing circuitry configured to
respectively collect, from a plurality of processing apparatuses that each execute a predetermined process with respect to at least one workpiece, a plurality of processing information sets that are respectively related to a plurality of processing steps executed by the plurality of processing apparatuses until one corresponding product is manufactured from the at least one workpiece, and
associate the plurality of processing information sets by assigning to the plurality of processing information sets a link identifier that permits a linkage between respective steps of the plurality of processing steps related to the one corresponding product, the link identifier being formed by a plurality of process IDs, each of the plurality of process IDs including a common portion that is commonly included in process IDs of two adjacent processing steps, and a unique portion unique to each processing step, and the plurality of process IDs being generated using the unique portion of a first process ID generated for an upstream first processing step as the common portion of a second process ID generated for a downstream second processing step, the upstream first processing step and the downstream second processing step being two mutually adjacent processing steps, such that the unique portion of the first process ID is same as the common portion of the second process ID.

11. The control apparatus for industrial equipment according to claim 10, wherein the processing circuitry is further configured to generate the plurality of process IDs that form the link identifier and respectively correspond to the plurality of processing steps.

12. The control apparatus for industrial equipment according to claim 11, wherein the processing circuitry is further configured to detect a start of processing in each of the processing apparatuses, and generate the corresponding process ID when the start of the processing in one of the processing apparatuses is detected.

13. The control apparatus for industrial equipment according to claim 10, wherein the processing circuitry is further configured to output the plurality of processing information sets that are related to the one product and are associated with each other.

14. The control apparatus for industrial equipment according to claim 13, wherein the processing circuitry is further configured to manage the plurality of processing information sets.

15. An information collection method for industrial equipment, the information collection method being executed in an information collection system for industrial equipment, the information collection system having processing circuitry configured to control a plurality of processing apparatuses that each execute a predetermined process with respect to at least one workpiece, the information collection method comprising:
respectively collecting, from the plurality of processing apparatuses, a plurality of processing information sets that are respectively related to a plurality of processing steps executed by the plurality of processing apparatuses until one corresponding product is manufactured from the at least one workpiece; and
associating the plurality of processing information sets by assigning to the plurality of processing information sets a link identifier that permits linkage between the plurality of processing steps related to the one corresponding product, the link identifier being formed by a plurality of process IDs, each of the plurality of process IDs including a common portion that is commonly included in process IDs of two adjacent processing steps, and a unique portion unique to each processing step, and the plurality of process IDs being generated using the unique portion of a first process ID generated for an upstream first processing step as the common portion of a second process ID generated for a downstream second processing step, the upstream first processing step and the downstream second processing step being two mutually adjacent processing steps, such that the unique portion of the first process ID is same as the common portion of the second process ID.

16. The information collection method according to claim 15, further comprising:
generating the plurality of process IDs that form the link identifier and respectively correspond to the plurality of processing steps.

17. The information collection method according to claim 16, further comprising:
detecting a start of processing in each of the processing apparatuses; and
generating, when the start of the processing in one of the processing apparatuses is detected, the corresponding process ID.

18. The information collection method according to claim 15, further comprising:
outputting the plurality of processing information sets that are related to the one product and are associated with each other.

19. The information collection method according to claim 18, further comprising:
managing the plurality of processing information sets.

* * * * *